(12) United States Patent
Gagliano et al.

(10) Patent No.: US 11,566,515 B2
(45) Date of Patent: Jan. 31, 2023

(54) ADJUSTING WELLBORE PLUG AND ABANDONMENT OPERATION USING EMISSION DATA

(71) Applicant: Landmark Graphics Corporation, Houston, TX (US)

(72) Inventors: Jesse Marc Gagliano, Lafayette, LA (US); Morgan Michelle Horbatko, Denver, CO (US); Robert M. Hull, Houston, TX (US); Mark Jude Richard, Houston, TX (US); Juan Vasquez, Bakersfield, CA (US); Richard Mauro, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 132 days.

(21) Appl. No.: 17/219,999

(22) Filed: Apr. 1, 2021

(65) Prior Publication Data

US 2022/0316321 A1 Oct. 6, 2022

(51) Int. Cl.
*G06N 20/00* (2019.01)
*E21B 47/09* (2012.01)
*E21B 44/00* (2006.01)
*E21B 33/12* (2006.01)

(52) U.S. Cl.
CPC ............ *E21B 47/09* (2013.01); *E21B 33/12* (2013.01); *E21B 44/00* (2013.01); *G06N 20/00* (2019.01)

(58) Field of Classification Search
CPC .......... E21B 47/09; E21B 33/12; E21B 44/00; G06N 20/00
See application file for complete search history.

(56) References Cited

U.S. PATENT DOCUMENTS

2020/0123894 A1* 4/2020 Ross ................ E21B 43/11

OTHER PUBLICATIONS

Kang et al., "Direct measurements of methane emissions from abandoned oil and gas wells in Pennsylvania", PNAS, vol. 111, No. 51, Dec. 23, 2014, pp. 18173-18177.
Lebel et al., "Methane Emissions from Abandoned Oil and Gas Wells in California", Environ. Sci. Technol. 2020, 54, 22, Oct. 30, 2020, pp. 14617-14626.
Ferrar, "Documenting Emissions From New Oil and Gas Wells in California", Fractracker Alliance, Nov. 18, 2022, 16 pages.
"Methane Emissions Management Event Presentation", 2021 Avanade Inc., Jan. 2021, 72 pages.

* cited by examiner

*Primary Examiner* — Roy Y Yi
*Assistant Examiner* — Geoffrey T Evans
(74) *Attorney, Agent, or Firm* — Kilpatrick Townsend & Stockton LLP (57) ABSTRACT

A system can include one or more sensors at a wellsite. The system can detect first emission data about emissions with respect to a wellbore over a first period of time. The system can detect second emission data about emissions with respect to the wellbore over a second period of time. The system can determine an adjustment to a plug and abandonment operation with respect to the wellbore based on the first emission data. The system can determine an amount of reduction in emissions from the wellbore using the first emission data and the second emission data. The system can output the amount of reduction in the emissions.

20 Claims, 5 Drawing Sheets

ADJUSTING WELLBORE PLUG AND ABANDONMENT OPERATION USING EMISSION DATA

TECHNICAL FIELD

The present disclosure relates generally to wellbore operations and, more particularly (although not necessarily exclusively), to adjusting a wellbore operation based on emission data.

BACKGROUND

A wellbore that is no longer in use or that is depleted may be abandoned. An abandoned wellbore may be referred to as an orphan wellbore—i.e., a wellbore that has been abandoned by an entity that previously operated the wellbore. Sometimes, the previous operating entity no longer exists or otherwise no longer has responsibility for the orphaned wellbore. Responsibility for such orphan wellbores can rest with a government entity or a different private entity than the previous operator. But, abandoned or orphaned wellbores may produce gas emissions, which may include emissions that can negatively affect sensitive environments. Examples of emissions can include carbon dioxide, methane, carbon monoxide, sulfur dioxide, other types of greenhouse gases, or other gases generally. A plug and abandonment operation can be performed on the abandoned wellbore to reduce emissions from the abandoned wellbore. Alternatively, the plug and abandonment operation can be performed on a wellbore owned by an operating entity when, for example, the operating entity decides to retire or otherwise abandon the wellbore. But selecting the type of plug and abandonment operation to perform, as well as selected processes within the plug and abandonment operation, can be difficult to result in a maximized reduction in emissions subsequent to the plug and abandonment operation.

DETAILED DESCRIPTION

Certain aspects and examples of the present disclosure relate to using emission data to adjust a plug and abandonment operation at a wellsite due to emissions detected at the wellsite. The plug and abandonment operation may involve plugging a wellbore that is no longer in use, depleted of hydrocarbon material, or for other, suitable reasons. Prior to performing the plug and abandonment operation, various emissions that can be harmful can originate from the wellbore. The emissions can include carbon emissions, such as carbon dioxide, greenhouse gas emissions, such as methane and sulfur dioxide, and other harmful emissions such as carbon monoxide. By using certain aspects of the present disclosure, the plug and abandonment operation can be adjusted to result in the emissions being greatly mitigated or eliminated subsequent to the operation.

A plug and abandonment operation can involve determining a type, or combination of types, of material to use, an amount of material to use, a location in the wellbore at which to apply the operation, and other processes or tools. The plug and abandonment operation can be adjusted based on detected emissions from the wellbore. Emissions can be detected using an emissions sensor that can be positioned at the wellbore for detecting emission type, emission amount, emission origination, and other suitable emission detection parameters. In some examples, the emissions sensor can be positioned on a drone, on a satellite, or otherwise remote from the wellbore for detecting the emission type, the emission amount, the emission origination, and other suitable emission detection parameters.

For example, an emissions sensor can detect first emission data at the wellbore over a first period of time that is before the plug and abandonment operation. Based on the emission type, the emission amount, the emission origination, etc., of the first emission data, the plug and abandonment operation can be adjusted to optimize the plug and abandonment operation for plugging the wellbore to mitigate or eliminate emissions at the wellbore. Subsequent to the plug and abandonment operation being performed at the wellbore, the emissions sensor can detect emission data at the wellbore over a subsequent period of time, after the plug and abandonment operation. This emission data can characterize emissions at the wellbore after the plug and abandonment operation is performed. A reduction in emissions can be calculated based on the first emission data and the second emission data, and the reduction in emissions can be output. The reduction can be used to establish the significant benefit achieved by reducing or eliminating wellbore emissions by performing the plug and abandonment operation. In some examples, the plug and abandonment operation can be customized to maximize a reduction in emissions from the wellbore.

Emissions may not be tracked or otherwise monitored at operator wells or at orphan wells. Orphan wells may include wells that are owned by government entities and that are no longer in use. The emissions can include greenhouse gas emissions, such as carbon dioxide and methane, and can include other emissions harmful to the atmosphere such as sulfur dioxide, carbon monoxide, and the like. The emissions can be tracked before a plug and abandonment operation is performed on a wellbore. Emissions that are detected at the wellbore can be used to adjust or otherwise determine the plug and abandonment operation. In some examples, the plug and abandonment operation is a second plug and abandonment operation performed subsequent to a first plug and abandonment operation in which the first plug and abandonment operation was not effective or otherwise allows emissions to be emitted from the wellsite.

For example, a sensor can be positioned at a wellsite that includes the wellbore, and the sensor can detect emissions coming from the wellbore. The sensor can detect or otherwise receive emission data indicating a level of emissions from the wellbore, a type of emission from the wellbore, an origination location of the emissions from the wellbore, and other suitable indications. The sensor can transmit the emission data to a computing device for adjusting the plug and abandonment operation. In some examples, the sensor can be included in the computing device. For example, the sensor can be implemented in software included in the computing device. The emission data can be used to adjust a type of material used in the plug and abandonment operation, an amount of the material used in the plug and abandonment operation, and other parameters of the plug and abandonment operation. Additionally or alternatively, the emissions can be detected after the plug and abandonment operation. A reduction in the emissions at the wellbore can be calculated by determining a difference between emissions detected before the plug and abandonment operation and emissions detected after the plug and abandonment operation.

In some examples in which a wellbore is planned or scheduled to be plugged and abandoned, emissions from the wellbore can be detected before the plug and abandonment operation. A sensor, such as an emissions sensor, can be positioned at the wellbore, or remote from the wellbore, such as a satellite emissions sensor, for detecting emissions from the wellbore. The sensor can detect various emission types such as carbon emissions, greenhouse gas emissions, and other emissions that may be harmful to humans, the atmosphere, and the like. Additionally or alternatively, the sensor can detect the emissions from a location surrounding the wellbore. The detected emission data can be transmitted to a computing device via radio wave, WIFI, Bluetooth™, cellular data, or other suitable means. The computing device can record or otherwise document the emission data for determining whether or how to adjust the plug and abandonment operation to optimize the plug and abandonment operation. Once adjusted, the plug and abandonment operation can be performed with respect to the wellbore. Subsequent to the plug and abandonment operation being performed with respect to the wellbore, the sensor can detect emissions data that indicate emissions from the wellbore after the plug and abandonment operation. The detected emissions data after the plug and abandonment operation can be transmitted to the computing device via radio wave, WIFI, Bluetooth™, cellular data, or other suitable means. The computing device can use the emissions data detected before the plug and abandonment operation and the emissions data detected after the plug and abandonment operation to determine a reduction in emissions from the wellbore. An amount of the reduction in the emissions from the wellbore can be output by the computing device for viewing by an entity such as an operator of the plug and abandonment operation.

The above illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
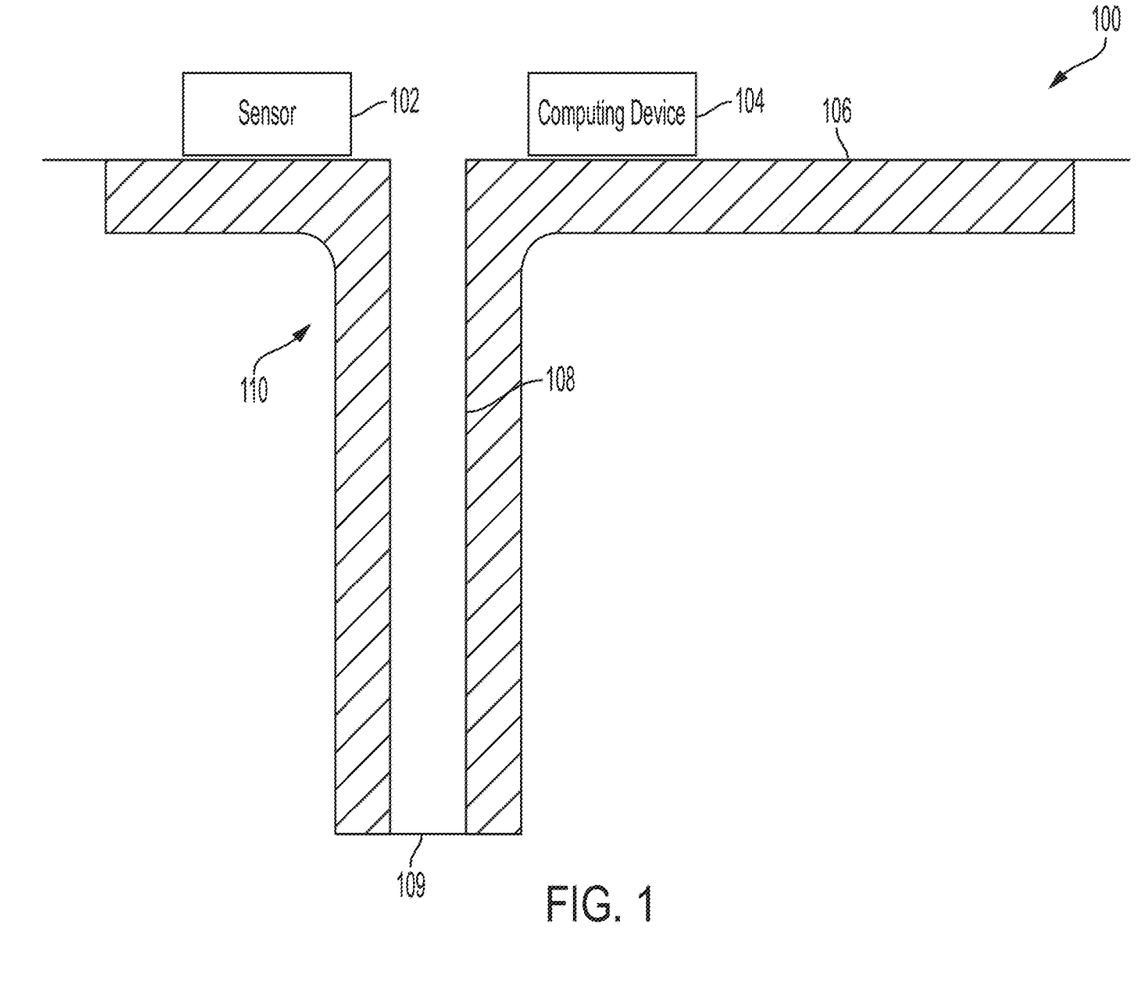
FIG. 1 is a cross-sectional view of a well system that includes a sensor and a computing system for adjusting a plug and abandonment operation to reduce emissions from a wellbore according to one example of the present disclosure.

FIG. 1 is a cross-sectional view of a well system 100 that includes a sensor 102 and a computing device 104 according to one example of the present disclosure. The sensor 102 and the computing device 104 can be positioned at a surface 106 of the well system 100. In some examples, the computing device 104 can be positioned remote from the well system 100, the sensor 102 can be positioned remote from the well system 100, or a combination thereof. The computing device 104 can be communicatively coupled to the sensor 102 via a wired connection, a wireless connection, a Bluetooth™ connection, or via other suitable means. The sensor 102 can be positioned at the well system 100 for detecting, or otherwise receiving data about, emissions that are produced by, or otherwise originate from, a wellbore 108 of the well system 100. The computing device 104 can receive the data about the emissions.

The well system 100 can include the wellbore 108 that is formed in a subterranean or subsea formation 110. The wellbore 108, in some examples, may be abandoned or otherwise no longer in use. The wellbore 108 can be a vertical wellbore, a horizontal wellbore, a general wellbore, an open-hole wellbore, or other suitable type of wellbore. As illustrated, the wellbore 108 is a vertical wellbore that includes a bottom 109 of the wellbore 108. The subterranean or subsea formation 110 may include hydrocarbon material, such as methane, and may additionally or alternatively include sequestered carbon-based material such as carbon monoxide, carbon dioxide, or other suitable carbon-based material. The wellbore 108 may be formed in the subterranean or subsea formation 110 for extracting produced hydrocarbons or for other suitable goals of forming the wellbore 108.

The sensor 102 may include an emissions sensor that can detect or otherwise receive information relating to emissions at the well system 100. In some examples in which the sensor 102 is the emissions sensor, the sensor 102 can be an infrared sensor, a catalytic sensor, a laser sensor, a photoacoustic sensor, or other suitable type of sensor for detecting the emissions. The sensor 102 can include a set of sensors that are communicatively coupled for detecting emissions at the well system 100. The information received by the sensor 102 may indicate emissions that originate from the wellbore 108. For example, the sensor 102 may receive emission data that indicate that carbon dioxide, methane, and carbon monoxide is being emitted from the wellbore 108. Additionally or alternatively, the sensor 102 may receive emission data that indicate that the emissions are originating from a location within the subterranean or subsea formation 110 or the wellbore 108. The sensor 102 can receive other suitable information relating to emissions at the well system 100.

The computing device 104 can receive the information from the sensor 102. For example, the computing device 104 can receive first emission data from the sensor 102 that indicates a type, or types, of emissions at the wellbore 108, an amount of the emissions from the wellbore 108, and an origination location of the emissions within the wellbore 108. Other suitable information can be included in the first emission data. The first emission data can characterize emissions from the wellbore 108 before a plug and abandonment operation is performed with respect to the wellbore 108. Additionally or alternatively, the computing device 104 can receive, from the sensor 102, second emission data, which can characterize emissions from the wellbore 108 subsequent to the plug and abandonment operation being performed with respect to the wellbore 108. The computing device 104 can determine a reduction in emissions at the well system 100, or from the wellbore 108, based on the first emission data and the second emission data. For example, the computing device 104 can calculate a difference between the first emission data and the second emission data to determine the reduction in the emissions. The computing device 104 can output an amount of the reduction in the emissions from the wellbore 108.

Figure 2:
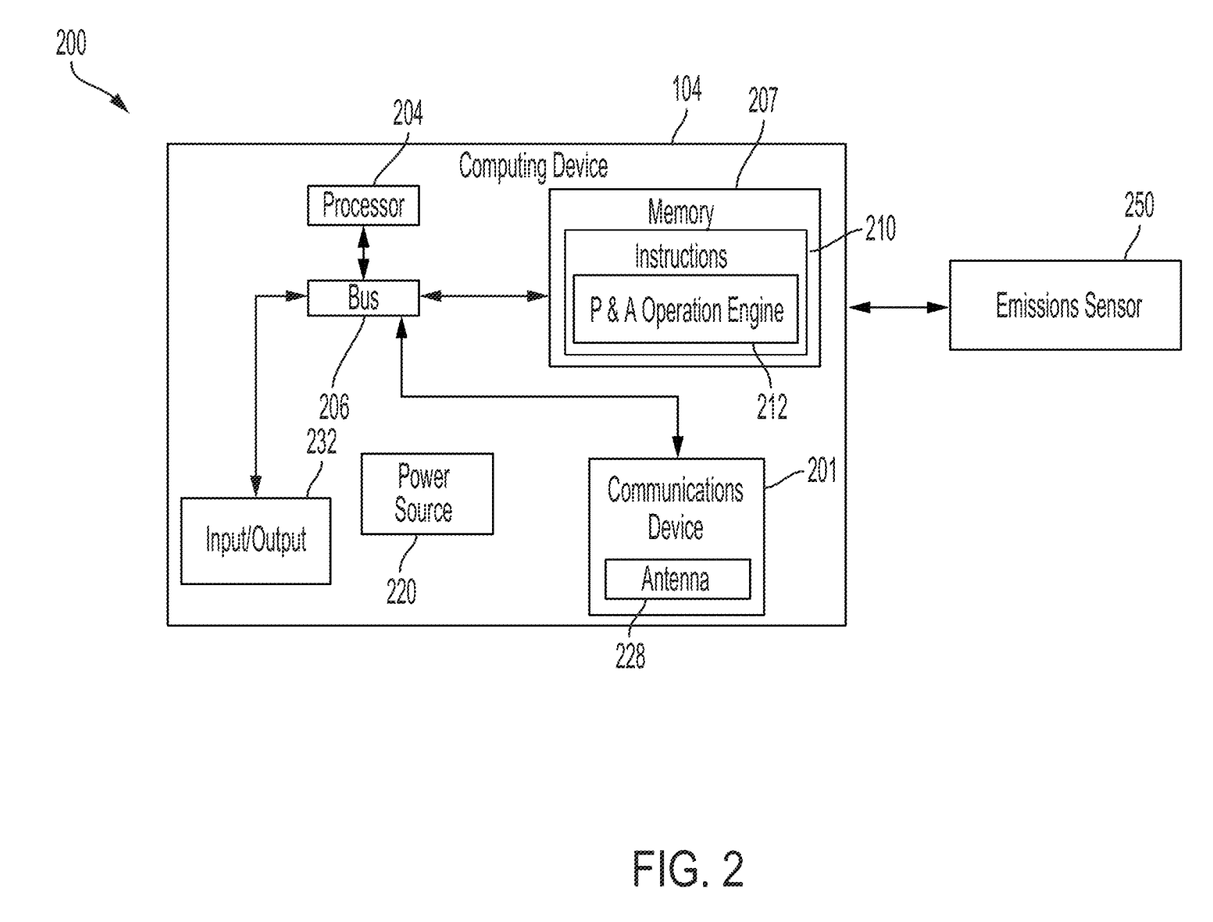
FIG. 2 is a block diagram of a computing system for adjusting a plug and abandonment operation using emission data according to one example of the present disclosure.

FIG. 2 is a block diagram of a computing system 200 for adjusting a plug and abandonment operation using emission data according to one example of the present disclosure. The components shown in FIG. 2, such as the processor 204, memory 207, power source 220, and a communications device 201, may be integrated into a single structure, such as within a single housing of the computing device 104. Alternatively, the components shown in FIG. 2 can be distributed from one another and in electrical communication with each other.

The computing system 200 may include the computing device 104. The computing device 104 can include a processor 204, a memory 207, and a bus 206. The processor 204 can execute one or more operations for adjusting a plug and abandonment operation based on emission data relating to the wellbore 108. The processor 204 can execute instructions stored in the memory 207 to perform the operations. The processor 204 can include one processing device or multiple processing devices or cores. Non-limiting examples of the processor 204 include a Field-Programmable Gate Array ("FPGA"), an application-specific integrated circuit ("ASIC"), a microprocessor, etc.

The processor 204 can be communicatively coupled to the memory 207 via the bus 206. The non-volatile memory 207 may include any type of memory device that retains stored information when powered off. Non-limiting examples of the memory 207 may include EEPROM, flash memory, or any other type of non-volatile memory. In some examples, at least part of the memory 207 can include a medium from which the processor 204 can read instructions. A computer-readable medium can include electronic, optical, magnetic, or other storage devices capable of providing the processor 204 with computer-readable instructions or other program code. Non-limiting examples of a computer-readable medium include (but are not limited to) magnetic disk(s), memory chip(s), ROM, RAM, an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

In some examples, the memory 207 can include computer program instructions 210 for adjusting the plug and abandonment operation based on the emission data relating to the wellbore 108. For example, the instructions 210 can include a plug and abandonment operation engine 212 that is executable by the processor 204 for causing the processor 204 to determine optimized parameters for the plug and abandonment operation. For example, the processor 204 can execute the plug and abandonment operation engine 212 to determine a type of material to use for plugging the wellbore 108, an amount of material to use for plugging the wellbore 108, and other suitable parameters relating to the plug and abandonment operation in response to receiving emission data from a sensor 102, such as an emissions sensor 250. The emissions sensor 250 can be communicatively coupled to the computing device 104. Alternatively, the emissions sensor 250 can be included in the computing device 104 implemented, for example, in software included in the memory 207.

The computing device 104 can include a power source 220. The power source 220 can be in electrical communication with the computing device 104 and the communications device 201. In some examples, the power source 220 can include a battery or an electrical cable such as a wireline. The power source 220 can include an AC signal generator.

The computing device 104 can operate the power source 220 to apply a transmission signal to the antenna 228 to generate electromagnetic waves that convey data relating to emissions from the wellbore 108 to other systems. For example, the computing device 104 can cause the power source 220 to apply a voltage with a frequency within a specific frequency range to the antenna 228. This can cause the antenna 228 to generate a wireless transmission. In other examples, the computing device 104, rather than the power source 220, can apply the transmission signal to the antenna 228 for generating the wireless transmission.

In some examples, part of the communications device 201 can be implemented in software. For example, the communications device 201 can include additional instructions stored in the memory 207 for controlling functions of the communication device 201. The communications device 201 can receive signals from remote devices and transmit data to remote devices such as the emissions sensor 250. For example, the communications device 201 can transmit wireless communications that are modulated by data via the antenna 228. In some examples, the communications device 201 can receive signals, such as signals associated with data to be transmitted, from the processor 204 and amplify, filter, modulate, frequency shift, or otherwise manipulate the signals. In some examples, the communications device 201 can transmit the manipulated signals to the antenna 228. The antenna 228 can receive the manipulated signals and responsively generate wireless communications that can carry the data.

Additionally or alternatively, the computing device 104 can include an input/output interface 232. The input/output interface 232 can connect to a keyboard, pointing device, display, and other computer input/output devices. An operator may provide input using the input/output interface 232. Emission data, such as type of emission, amount of emission, origination of emission, etc., can be displayed to an operator through a display that is connected to or that is part of the input/output interface 232. The displayed emission data can be observed by the operator, or by a supervisor of the plug and abandonment operation, who can make adjustments based on the displayed values. In some examples, the plug and abandonment operation can be adjusted by the computing device 104 automatically based on the emission data.

In some examples, the computing system 200 can include a machine-learning model. The machine-learning model can be trained on historical data about previously executed plug and abandonment operations. The machine-learning model can take, as input, the first emission data that includes the type, the amount, and the origination of emissions from the wellbore 108 and can output optimized parameters for the plug and abandonment operation. The computing system 200, by using the machine-learning model, can automatically detect the emissions, and adjust and perform the plug and abandonment operation with respect to, the wellbore 108.

Figure 3:
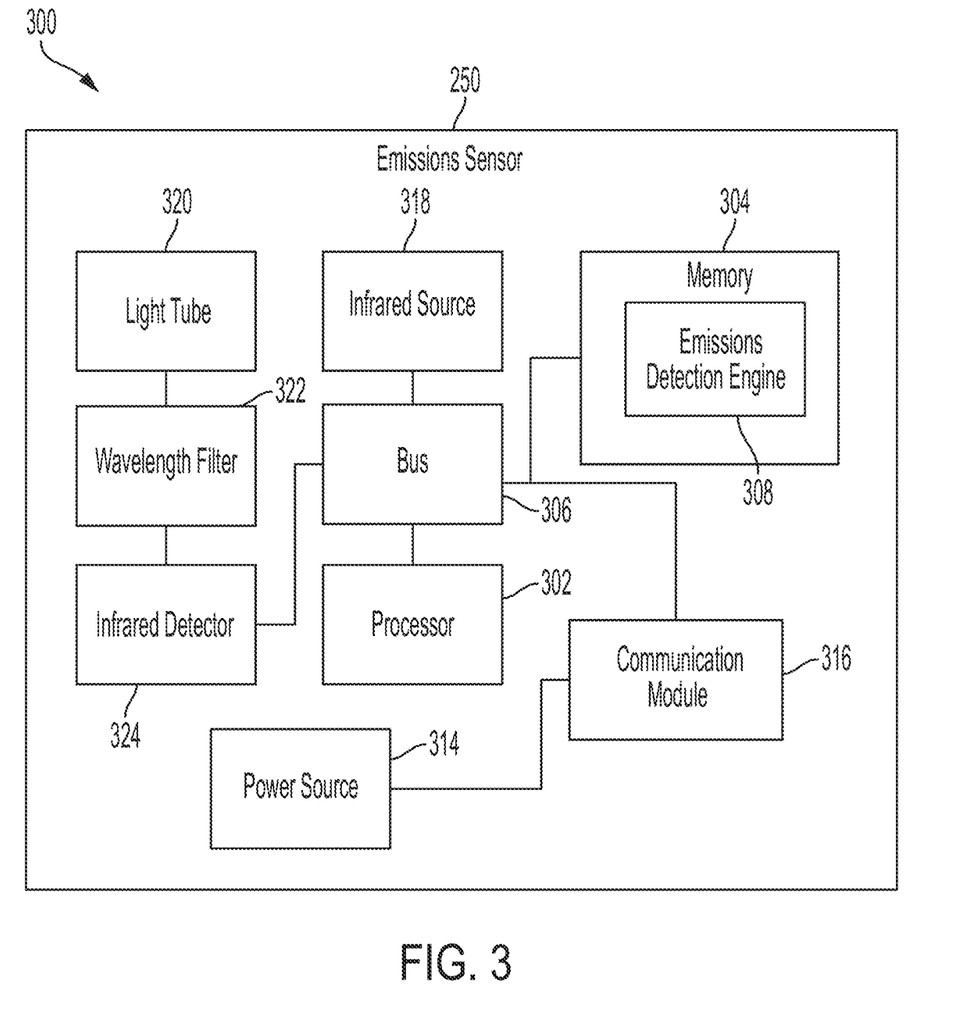
FIG. 3 is a block diagram of an emission sensor for detecting emission data used to adjust a plug and abandonment operation according to one example of the present disclosure.

FIG. 3 is a block diagram of an emissions sensor 250 according to one example of the present disclosure. The emissions sensor 250 can be similar or identical to the sensor 102 of the well system 100. As illustrated, the emissions sensor 250 is an infrared sensor, but the emissions sensor 250 can include other suitable types of sensors such as a laser sensor, a catalytic sensor, a photoacoustic sensor, or other suitable type of sensor. The emissions sensor 250 can be positioned proximate to the well system 100 for detecting data relating to emissions of the wellbore 108. Additionally or alternatively, the emissions sensor 250 can be handheld, can be included in a drone, can be included in a satellite, or otherwise remotely disposed for detecting emissions from the wellbore 108.

In examples in which the emissions sensor 250 is included in the drone, the drone can be remote-controlled by an individual associated with the plug and abandonment operation. Alternatively, the drone can be controlled automatically by the computing device 104, the emissions sensor 250, or other suitable devices for controlling the drone. The emissions sensor 250 can be positioned on the drone. For example, the emissions sensor 250 can be mechanically coupled, or otherwise suitably coupled, to the drone. In other examples, the drone can include the emissions sensor 250 implemented in software included in memory of the drone. The drone can be positioned, by the individual, the computing device 104, or other suitable controlling entity, proximate to the wellbore 108. For example, the drone can be positioned in the airspace above the wellbore 108 for detecting emissions from the wellbore 108. In response to the drone being positioned proximate to the wellbore 108, the emissions sensor 250 can detect emission data from the wellbore 108. The detected emission data can be transmitted by the drone, or by the emissions sensor 250, via a wireless connection to the computing device 104 for adjusting the plug and abandonment operation. In some examples, the drone can return to a docking station, such as a charging station, and the drone or the emissions sensor 250 can be connected via a wired connection to the computing device 104 for transmitting the emission data to the computing device 104.

The emissions sensor 250 can include a processor 302, a memory 304, and a bus 306. The processor 302 can execute one or more operations for detecting emissions with respect to the wellbore 108. The processor 302 can execute instructions stored in the memory 304 to perform the operations. The processor 302 can include one processing device or multiple processing devices or cores. Non-limiting examples of the processor 302 include an FPGA, an ASIC, a microprocessor, etc.

The processor 302 can be communicatively coupled to the memory 304 via the bus 306. The memory 304 can be non-volatile and may include a suitable type of memory device that retains stored information when powered off. Non-limiting examples of the memory 304 may include EEPROM, flash memory, or other suitable types of non-volatile memory. In some examples, at least part of the memory 304 can include a medium from which the processor 302 can read instructions. A computer-readable medium can include electronic, optical, magnetic, or other storage devices capable of providing the processor 302 with computer-readable instructions or other program code. Non-limiting examples of a computer-readable medium include (but are not limited to) magnetic disk(s), memory chip(s), ROM, RAM, an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

In some examples, the memory 304 can include software, such as an emissions detection engine 308 or other suitable software for determining emissions relating to the wellbore 108. For example, the emissions detection engine 308 can be executed by the processor 302 for causing the emission sensor 250 to detect carbon emissions from the wellbore 108. Additionally or alternatively, the processor 302 can execute the emissions detection engine 308 to cause the emission sensor 250 to detect greenhouse gas emissions, or other emissions, from the wellbore 108. Additionally or alternatively, the emissions sensor 250 can include a chromatograph coupled to the bus 306, implemented in software and included in the memory 304, or otherwise included in the emissions sensor 250. The chromatograph can identify a type of emission from the wellbore 108.

The emission sensor 250 can include a power source 314. The power source 314 can be in electrical communication with the emission sensor 250 and a communication module 316. In some examples, the power source 314 can include a battery or an electrical cable such as a wireline. The power source 314 can include an AC signal generator. The emission sensor 250 can operate the power source 314 to apply a transmission signal to the communication module 316 to generate electromagnetic waves that convey data relating to emissions from the wellbore 108 to other systems. For example, the emission sensor 250 can cause the power source 314 to apply a voltage with a frequency within a specific frequency range to the communication module 316. This can cause the communication module 316 to generate a wireless transmission. In other examples, the emission sensor 250, rather than the power source 314, can apply the transmission signal to the communication module 316 for generating the wireless transmission.

In some examples, part of the communication module 316 can be implemented in software. For example, the communication module 316 can include additional instructions stored in the memory 304 for controlling functions of the communication module 316. The communication module 316 can receive signals from remote devices and transmit data to remote devices such as the computing device 104. For example, the communication module 316 can transmit modulated wireless communications. In some examples, the communication module 316 can receive signals, such as signals associated with data to be transmitted, from the processor 302 and amplify, filter, modulate, frequency shift, or otherwise manipulate the signals.

As illustrated, the emissions sensor 250 is an infrared sensor and includes an infrared source 318, a light tube 320, a wavelength filter 322, and an infrared detector 324. The emissions sensor 250 can include additional or alternative components in examples in which the emissions sensor 250 is a different type of sensor. The infrared source 318 can be a lamp or other electrical device that can produce or otherwise emit light with infrared wavelength. The infrared source 318 can be communicatively coupled to the bus 306 and can be activated by the emissions sensor 250 via the processor 302. The light tube 320 can be positioned on the emissions sensor 250 for receiving a backscattered signal in response to the infrared source 318 emitting a signal. The backscattered signal can include light in visible and in infrared spectrum. The light tube 320 can be coupled to the wavelength filter 322. The wavelength filter 322 can filter out light within the backscattered signal that is not within the infrared spectrum. The infrared detector 324 can be coupled to the wavelength filter 322 and can receive the filtered backscattered signal. The infrared detector 324 can translate the received, filtered, backscattered signal into emission data that indicates an amount, a type, and an origination of emissions from the wellbore 108.

In other examples, the emissions sensor 250 can include a catalytic sensor. In these examples, the emissions sensor 250 can include, as described above, the processor 302, the memory 304, the bus 306, the emissions detection engine 308, the power source 314, and the communication module 316. Alternative to components for the infrared sensor, the emissions sensor 250 as the catalytic sensor can include a combustion chamber, a resistor, and a resistance detector. The combustion chamber can be positioned on the emissions sensor 250 for receiving a small sample of emissions from the wellbore 108 and can ignite the sample. The resistor can be coupled to the combustion chamber and to the resistance detector. The resistance detector can additionally be communicatively coupled to the bus 306. In response to igniting the sample, the resistance detector can detect a change in resistance of gas in the combustion chamber and can translate the change into a measure of emissions from the wellbore 108.

In other examples, the emissions sensor 250 can include a photoacoustic sensor. In these examples, the emissions sensor 250 can include, as described above, the processor 302, the memory 304, the bus 306, the emissions detection engine 308, the power source 314, and the communication module 316. Alternative to components for the infrared sensor, the emissions sensor 250 as the photoacoustic sensor can include a sample chamber, a distributed feedback laser, and a photoacoustic detector. The sample chamber can be positioned on the emissions sensor 250 to receive a sample of emissions from the wellbore 108. The distributed feedback laser can be positioned on the emissions sensor 250 to expose tuned electromagnetic waves to the sample of emissions in the sample chamber. The sample can generate pressure waves. The photoacoustic detector can receive the pressure waves and can detect emissions that are included within the sample of emissions from the wellbore 108. The photoacoustic detector can be communicatively coupled to the bus 306 and can translate the received pressure waves into emission data that the emissions sensor 250 can transmit to the computing device 104.

Figure 4:
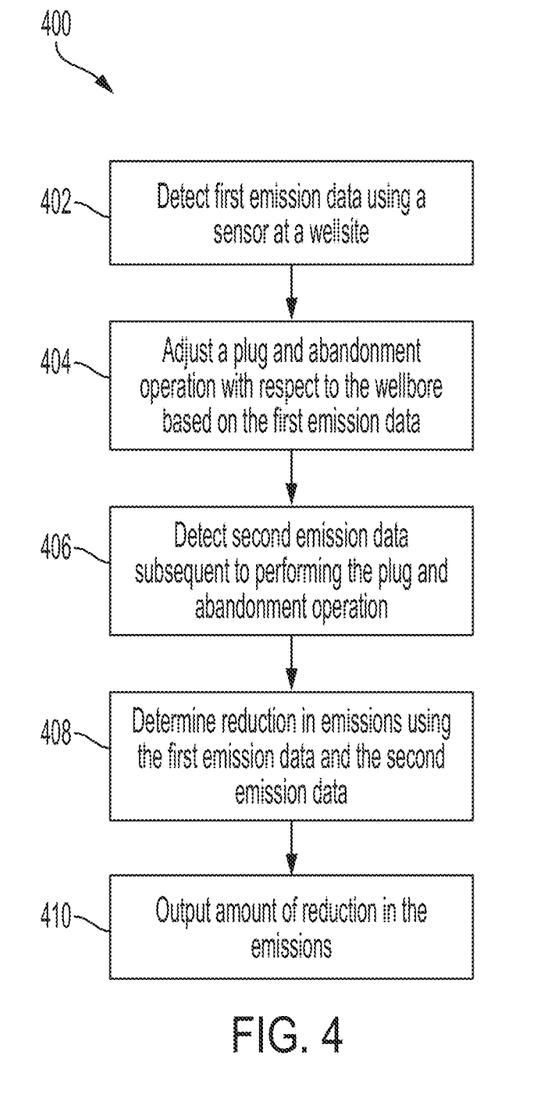
FIG. 4 is a flow chart of a process to adjust a plug and abandonment operation based on detected emission data according to one example of the present disclosure.

FIG. 4 is a flow chart of a process 400 to adjust a plug and abandonment operation based on detected emission data according to one example of the present disclosure. Other examples of flow charts may involve more steps, fewer steps, different steps, or a different combination of steps than is shown in FIG. 4. The below steps are described with reference to the components of FIGS. 1-3 described above.

At block 402, the computing system 200 detects first emission data at a wellsite using a sensor 102. In some examples, one or more sensors 102 can be positioned for detecting the first emission data. The wellsite may be similar or identical to the well system 100. The computing system 200 may use the emissions sensor 250 to detect the first emission data over a first period of time that is prior to a plug and abandonment operation performed with respect to the wellbore 108. The first emission data may indicate emissions from the wellbore 108 at the wellsite before the plug and abandonment operation is performed at the wellsite with respect to the wellbore 108. Additionally or alternatively, the first emission data may indicate a type of emission, an amount of emission, an origination of emission, or other suitable information, relating to emissions from the wellbore 108. For example, the first emission data may indicate that 20 pounds of methane per hour is leaking from a location within the wellbore 108. Other suitable information relating to emissions from the wellbore 108 can be included in the first emission data.

At block 404, the computing system 200 adjusts the plug and abandonment operation with respect to the wellbore 108 based on the first emission data. Subsequent to detecting the first emission data, the plug and abandonment operation can be performed. For example, a set of materials can be positioned in the wellbore 108 for plugging the wellbore 108. The materials can include materials that prevent or mitigate emissions from the wellbore 108. The materials can include cementitious material, such as Portland cement, resin-based materials, Earth-based materials, such as clay or other soils, and other suitable materials or barriers for plugging the wellbore 108. The materials can be positioned in the wellbore 108 in layers or in combination. For example, a first cementitious material can be positioned at the bottom 109 of the wellbore 108, then the Earth-based material can be positioned on top of the first cementitious material, then a second cementitious material can be positioned on top of the Earth-based material, etc.

The plug and abandonment operation may include various parameters such as one or more materials to use to plug the wellbore 108, such as the cementitious material, the resin, or other suitable barrier, an amount of the materials to use to plug the wellbore 108, a process flow of positioning the materials in the wellbore 108 to plug the wellbore 108, and the like. Optimizing the plug and abandonment for mitigating or eliminating emissions from the wellbore 108 can involve optimizing the parameters of the plug and abandonment operation based on the first emission data. The computing system 200 may use the first emission data to determine or to adjust the parameters of the plug and abandonment operation. The computing system 200 may adjust the type of material used for the plug and abandonment operation based on the type of emission detected in the first emission data. For example, the materials chosen to be positioned downhole to plug the wellbore 108 may depend on the type of emission from the wellbore 108. The computing system 200 may additionally or alternatively adjust other suitable parameters based on the first emission data. In some examples, the computing system 200 may display recommendations for an operator of the plug and abandonment operation to review, approve, or a combination thereof, for optimizing the parameters of the plug and abandonment operation based on the first emission data.

In some examples, the computing system 200 can use a trained machine-learning model to adjust the plug and abandonment operation with respect to the wellbore 108. The trained machine-learning model can be trained on data about historical plug and abandonment operations. For example, the trained machine-learning model can be trained on data about performances of the historical plug and abandonment operations, on data about reduction in emissions of the historical plug and abandonment operations, on data about types of wellbores associated with the historical plug and abandonment operations. The trained machine-learning model can be trained on other suitable data for adjusting the plug and abandonment operation. The trained machine-learning model can automatically, based on the first emission data, adjust parameters of the plug and abandonment operation such as a type of material used to plug the wellbore 108, an amount of material used to plug the wellbore 108, a location in the wellbore 108 to position the material, or a process flow of positioning the material in the wellbore 108 to plug the wellbore 108. The trained machine-learning model can adjust other suitable parameters of the plug and abandonment operation. The trained machine-learning model can map inputs to outputs. For example, input data types from the first emission data can be mapped to the adjusted parameters of the plug and abandonment operation.

At block 406, the computing system 200 detects second emission data subsequent to performing the plug and abandonment operation with respect to the wellbore 108. The second emission data can be detected by one or more sensors 102 over a second period of time that is after the plug and abandonment operation. Subsequent to adjusting the plug and abandonment operation based on the first emission data, the plug and abandonment operation can be performed in which the wellbore 108 can be plugged and abandoned. The wellbore 108 can be plugged using the adjusted plug and abandonment operation for mitigating or eliminating emissions from the wellbore 108. The computing system 200 can use the emission sensor 250 to detect second emission data with respect to the wellbore 108. The second emission data can indicate emissions from the wellbore 108 subsequent to the plug and abandonment operation. Additionally or alternatively, the second emission data may indicate the type of emission, the amount of emission, the origination of emission, or other suitable information, relating to emissions from the wellbore 108. In some examples, the first emission data and the second emission data can be transmitted to the computing system 200 via a wired connection or a wireless connection. The wired connection can include a metallic connection or a fiber optic connection. The wireless connection can include an electromagnetic connection, a microwave connection, an infrared connection, or a radio-wave connection.

At block 408, the computing system 200 determines a reduction in emissions using the first emission data and the second emission data. The reduction in emissions can include a reduction in emissions from the wellbore 108, from the well system 100, a combination thereof, or other suitable measures. The computing system 200 can determine the reduction in the emissions by calculating a difference in emissions between the first emission data and the second emission data. In some examples, the computing system 200 can calculate a difference between each type of emission.

At block 410, the computing system 200 outputs an amount of the reduction in emissions. Subsequent to determining the reduction in the emissions, the computing system 200 can output the amount of the reduction in the emissions. The computing system 200 can output the amount via the input/output interface 232. For example, the computing system 200 can output the amount on a display screen for viewing by an operator or supervisor of the plug and abandonment operation. In some examples, the computing system 200 can output the amount of the reduction in the emissions from the wellbore 108 for documentation purposes such as for filing for one or more tax credits.

For example, the computing system 200 can output the amount of the reduction in emissions to a readable and transmittable file. The transmittable file can be reviewed by a first entity seeking to file for the tax credits. Upon approval from the first entity, the computing system 200 can submit the transmittable file to a second entity that can grant the tax credits. In some examples, the tax credits can include a tax credit for reduction in emissions. In these examples, the computing system 200 can automatically generate the transmittable file, based on the output amount of reduction in emissions from the wellbore 108, for requesting the tax credit from the second entity, which can be a government or state entity.

Figure 5:
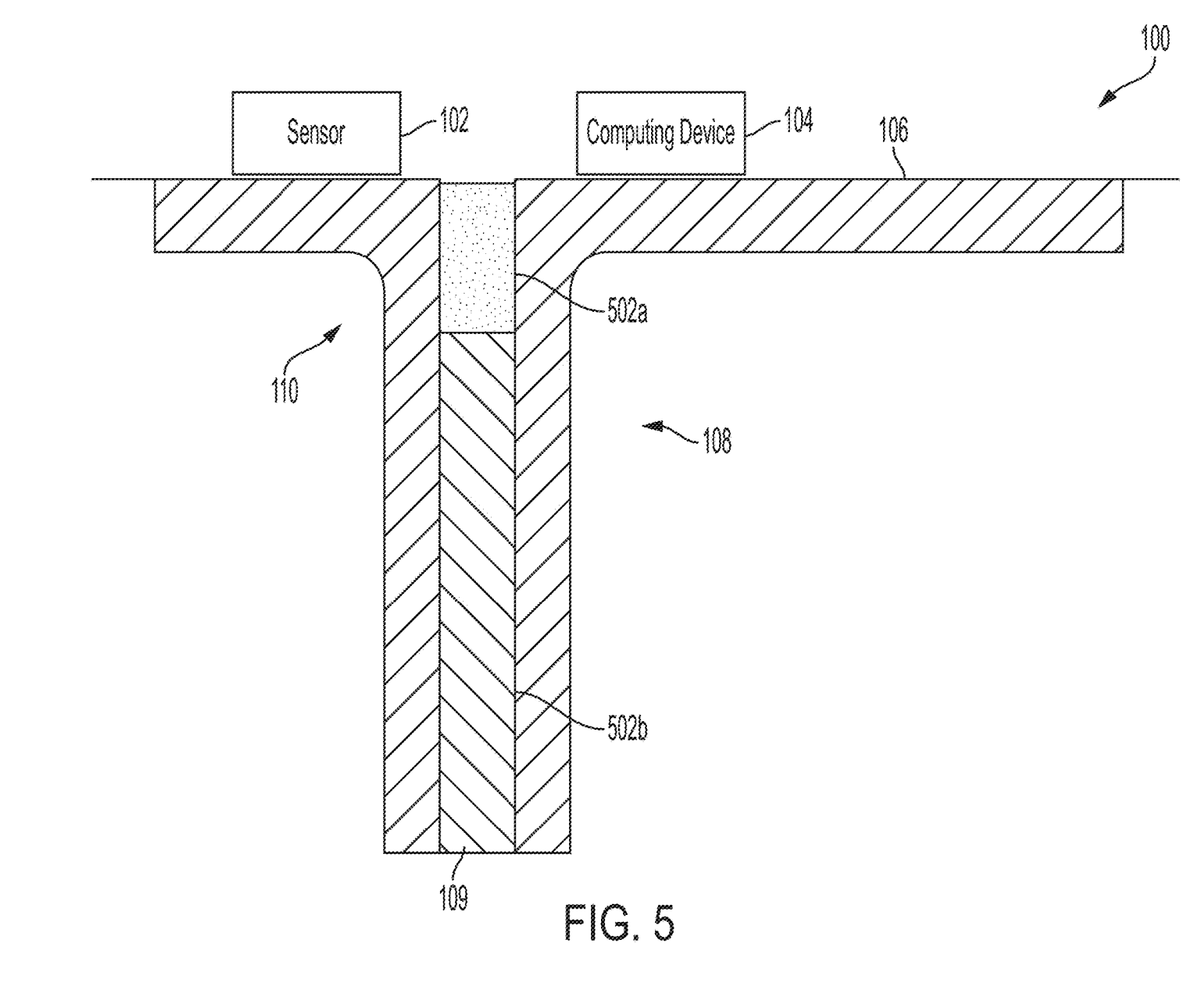
FIG. 5 is a schematic of a well system subsequent to a plug and abandonment operation, as adjusted, being performed with respect to a wellbore of the well system according to one example of the present disclosure.

FIG. 5 is a schematic of the well system 100 subsequent to a plug and abandonment operation being performed with respect to the wellbore 108 of the well system 100 according to one example of the present disclosure. Similar to FIG. 1, the well system 100 can include the sensor 102, the computing device 104, and the wellbore 108. The sensor 102 and the computing device 104 can be positioned at the surface 106 of the well system 100. The wellbore 108 can include the bottom 109 and can be formed in the subterranean or subsea formation 110.

Subsequent to the plug and abandonment operation being performed with respect to the wellbore 108, the well system 100 can additionally include wellbore plug materials 502a-b. The wellbore plug materials 502 can be positioned within the wellbore 108 for plugging the wellbore 108 to mitigate or eliminate emissions from the wellbore 108. As illustrated, the well system 100 includes two wellbore plug materials 502 but other suitable amounts or types of wellbore plug materials 502 can be included in the well system 100. The wellbore plug materials 502 can include a cementitious material, such as Portland or other types of cement, Earth-based material, such as clay, or other suitable material or barriers for plugging the wellbore 108 to mitigate or eliminate emissions from the wellbore 108. The wellbore plug materials 502 can be positioned in the wellbore 108 extending from the surface 106 to the bottom 109 of the wellbore 108. In response to the plug and abandonment operation being performed with respect to the wellbore 108, the sensor 102 can detect emissions from the plugged wellbore 108, and the computing device 104 can determine and output an amount of reduction in emissions from the wellbore 108.

In some aspects, systems, methods, and non-transitory computer-readable mediums for adjusting a plug and abandonment operation based on detected emission data are provided according to one or more of the following examples.

As used below, any reference to a series of examples is to be understood as a reference to each of those examples disjunctively (e.g., "Examples 1-4" is to be understood as "Examples 1, 2, 3, or 4").

Example 1 is a system comprising: one or more sensors positionable at a wellsite for detecting first emission data about emissions with respect to a wellbore at the wellsite over a first period of time and for, subsequent to performing a plug an abandonment operation, with an adjustment based on the first emission data, with respect to the wellbore, detecting second emission data about emissions with respect to the wellbore at the wellsite over a second period of time; a processor; and a non-transitory computer-readable medium comprising instructions that are executable by the processor to cause the processor to perform operations comprising: determining, based on the first emission data, the adjustment, to a type and a process for the plug and abandonment operation with respect to the wellbore; determining an amount of reduction in emissions using the first emission data and the second emission data; and outputting the amount of reduction in the emissions.

Example 2 is the system of example 1, wherein the operation of determining, based on the first emission data, the adjustment to the type and process for the plug and abandonment operation with respect to the wellbore includes determining a change to one or more parameters of the plug and abandonment operation.

Example 3 is the system of examples 1-2, wherein the one or more parameters of the plug and abandonment operation include at least one of a type of material used to plug the wellbore, an amount of material used to plug the wellbore, one or more locations in the wellbore to which to apply the plug and abandonment operation, or a process flow of positioning materials in the wellbore for plugging the wellbore.

Example 4 is the system of example 1, wherein the first emission data includes a type of the emissions, an amount of the emissions, and an origination location in the wellbore of the emissions.

Example 5 is the system of example 1, wherein the one or more sensors includes an infrared sensor, a catalytic sensor, or a photoacoustic sensor.

Example 6 is the system of example 1, wherein the operations further comprise outputting a command to cause the adjustment to the plug and abandonment operation.

Example 7 is the system of example 1, wherein the operation of determining, based on the first emission data, the adjustment to the type and process of the plug and abandonment operation of the wellbore includes using a trained machine-learning model to adjust the plug and abandonment operation, wherein the trained machine-learning model is trained on data about a performance of historical plug and abandonment operations, emission reduction associated with the historical plug and abandonment operations, and a type of wellbore associated with the historical plug and abandonment operations.

Example 8 is a method comprising: detecting, using one or more sensors at a wellsite, first emission data about emissions over a first period of time with respect to a wellbore; adjusting, based on the first emission data, a type and a process for a plug and abandonment operation with respect to the wellbore; subsequent to performing the plug and abandonment operation with respect to the wellbore, detecting, using the one or more sensors at the wellsite, second emission data about emissions over a second period of time with respect to the wellbore; determining an amount of reduction in emissions using the first emission data and the second emission data; and outputting the amount of reduction in the emissions.

Example 9 is the method of example 8, wherein adjusting, based on the first emission data, the type and the process for the plug and abandonment operation of the wellbore at the wellsite includes determining a change to one or more parameters of the plug and abandonment operation.

Example 10 is the method of examples 8-9, wherein the one or more parameters of the plug and abandonment operation include at least one of a type of material used to plug the wellbore, an amount of material used to plug the wellbore, one or more locations in the wellbore to which to apply the plug and abandonment operation, or a process flow of positioning materials in the wellbore for plugging the wellbore.

Example 11 is the method of example 8, wherein the first emission data includes a type of the emissions, an amount of the emissions, and an origination location in the wellbore of the emissions.

Example 12 is the method of example 8, wherein the one or more sensors includes an infrared sensor, a catalytic sensor, or a photoacoustic sensor.

Example 13 is the method of example 8, further comprising outputting a command to cause the adjustment to the type and the process of the plug and abandonment operation.

Example 14 is the method of example 8, wherein adjusting, based on the first emission data, a type and a process for a plug and abandonment operation with respect to the wellbore includes using a trained machine-learning model to adjust the plug and abandonment operation, wherein the trained machine-learning model is trained on data about a performance of historical plug and abandonment operations, emission reduction associated with the historical plug and abandonment operations, and a type of wellbore associated with the historical plug and abandonment operations.

Example 15 is a non-transitory computer-readable medium comprising instructions that are executable by a processing device for causing the processing device to perform operations comprising: receiving, from one or more sensors at a wellsite, first emission data about emissions over a first period of time with respect to a wellbore; determining, based on the first emission data, an adjustment to a type and process for a plug and abandonment operation with respect to the wellbore; subsequent to the plug and abandonment operation, as adjusted, being performed with respect to the wellbore, receiving, from the one or more sensors at the wellsite, second emission data about emissions over a second period of time with respect to the wellbore; determining an amount of reduction in emissions using the first emission data and the second emission data; and outputting the amount of reduction in the emissions.

Example 16 is the non-transitory computer-readable medium of example 15, wherein the operation of determining, based on first emission data about emissions over a first period of time with respect to a wellbore, an adjustment to a type and to a process for a plug and abandonment operation with respect to the wellbore includes determining a change to one or more parameters of the plug and abandonment operation.

Example 17 is the non-transitory computer-readable medium of examples 15-16, wherein the one or more parameters of the plug and abandonment operation include at least one of a type of material used to plug the wellbore, an amount of material used to plug the wellbore, one or more locations in the wellbore to which to apply the plug and abandonment operation, or a process flow of positioning materials in the wellbore for plugging the wellbore.

Example 18 is the non-transitory computer-readable medium of example 15, wherein the first emission data includes a type of the emissions, an amount of the emissions, and an origination location in the wellbore of the emissions.

Example 19 is the non-transitory computer-readable medium of example 15, wherein the operations further comprise outputting a command to cause the adjustment to the plug and abandonment operation.

Example 20 is the non-transitory computer-readable medium of example 15, wherein the operation of determining, based on first emission data about emissions over a first period of time with respect to a wellbore, an adjustment to a type and to a process for a plug and abandonment operation with respect to the wellbore includes using a trained machine-learning model to adjust the plug and abandonment operation, wherein the trained machine-learning model is trained on data about a performance of historical plug and abandonment operations, emission reduction associated with the historical plug and abandonment operations, and a type of wellbore associated with the historical plug and abandonment operations.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
one or more sensors positionable at a wellsite for detecting first emission data about emissions with respect to a wellbore at the wellsite over a first period of time and for, subsequent to performing a plug and abandonment operation, with an adjustment based on the first emission data, with respect to the wellbore, detecting second emission data about emissions with respect to the wellbore at the wellsite over a second period of time;
a processor; and
a non-transitory computer-readable medium comprising instructions that are executable by the processor to cause the processor to perform operations comprising:
determining, based on the first emission data, the adjustment, to a type and a process for the plug and abandonment operation with respect to the wellbore;
determining an amount of reduction in emissions using the first emission data and the second emission data; and
outputting the amount of reduction in the emissions.

2. The system of claim 1, wherein the operation of determining, based on the first emission data, the adjustment to the type and process for the plug and abandonment operation with respect to the wellbore includes determining a change to one or more parameters of the plug and abandonment operation.

3. The system of claim 2, wherein the one or more parameters of the plug and abandonment operation include at least one of a type of material used to plug the wellbore, an amount of material used to plug the wellbore, one or more locations in the wellbore to which to apply the plug and abandonment operation, or a process flow of positioning materials in the wellbore for plugging the wellbore.

4. The system of claim 1, wherein the first emission data includes a type of the emissions, an amount of the emissions, and an origination location in the wellbore of the emissions.

5. The system of claim 1, wherein the one or more sensors includes an infrared sensor, a catalytic sensor, or a photoacoustic sensor.

6. The system of claim 1, wherein the operations further comprise outputting a command to cause the adjustment to the plug and abandonment operation.

7. The system of claim 1, wherein the operation of determining, based on the first emission data, the adjustment to the type and process of the plug and abandonment operation of the wellbore includes using a trained machine-learning model to adjust the plug and abandonment operation, wherein the trained machine-learning model is trained on data about a performance of historical plug and abandonment operations, emission reduction associated with the historical plug and abandonment operations, and a type of wellbore associated with the historical plug and abandonment operations.

8. A method comprising:
detecting, using one or more sensors at a wellsite, first emission data about emissions over a first period of time with respect to a wellbore;
adjusting, based on the first emission data, a type and a process for a plug and abandonment operation with respect to the wellbore;
subsequent to performing the plug and abandonment operation with respect to the wellbore, detecting, using the one or more sensors at the wellsite, second emission data about emissions over a second period of time with respect to the wellbore;
determining an amount of reduction in emissions using the first emission data and the second emission data; and
outputting the amount of reduction in the emissions.

9. The method of claim 8, wherein adjusting, based on the first emission data, the type and the process for the plug and abandonment operation of the wellbore at the wellsite includes determining a change to one or more parameters of the plug and abandonment operation.

10. The method of claim 9, wherein the one or more parameters of the plug and abandonment operation include at least one of a type of material used to plug the wellbore, an amount of material used to plug the wellbore, one or more locations in the wellbore to which to apply the plug and abandonment operation, or a process flow of positioning materials in the wellbore for plugging the wellbore.

11. The method of claim 8, wherein the first emission data includes a type of the emissions, an amount of the emissions, and an origination location in the wellbore of the emissions.

12. The method of claim 8, wherein the one or more sensors includes an infrared sensor, a catalytic sensor, or a photoacoustic sensor.

13. The method of claim 8, further comprising outputting a command to cause the adjustment to the type and the process of the plug and abandonment operation.

14. The method of claim 8, wherein adjusting, based on the first emission data, a type and a process for a plug and abandonment operation with respect to the wellbore includes using a trained machine-learning model to adjust the plug and abandonment operation, wherein the trained machine-learning model is trained on data about a performance of historical plug and abandonment operations, emission reduction associated with the historical plug and abandonment operations, and a type of wellbore associated with the historical plug and abandonment operations.

15. A non-transitory computer-readable medium comprising instructions that are executable by a processing device for causing the processing device to perform operations comprising:
receiving, from one or more sensors at a wellsite, first emission data about emissions over a first period of time with respect to a wellbore;
determining, based on the first emission data, an adjustment to a type and process for a plug and abandonment operation with respect to the wellbore;
subsequent to the plug and abandonment operation, as adjusted, being performed with respect to the wellbore, receiving, from the one or more sensors at the wellsite, second emission data about emissions over a second period of time with respect to the wellbore;
determining an amount of reduction in emissions using the first emission data and the second emission data; and
outputting the amount of reduction in the emissions.

16. The non-transitory computer-readable medium of claim 15, wherein the operation of determining, based on first emission data about emissions over a first period of time with respect to a wellbore, an adjustment to a type and to a process for a plug and abandonment operation with respect to the wellbore includes determining a change to one or more parameters of the plug and abandonment operation.

17. The non-transitory computer-readable medium of claim 16, wherein the one or more parameters of the plug and abandonment operation include at least one of a type of material used to plug the wellbore, an amount of material used to plug the wellbore, one or more locations in the wellbore to which to apply the plug and abandonment operation, or a process flow of positioning materials in the wellbore for plugging the wellbore.

18. The non-transitory computer-readable medium of claim 15, wherein the first emission data includes a type of the emissions, an amount of the emissions, and an origination location in the wellbore of the emissions.

19. The non-transitory computer-readable medium of claim 15, wherein the operations further comprise outputting a command to cause the adjustment to the plug and abandonment operation.

20. The non-transitory computer-readable medium of claim 15, wherein the operation of determining, based on first emission data about emissions over a first period of time with respect to a wellbore, an adjustment to a type and to a process for a plug and abandonment operation with respect to the wellbore includes using a trained machine-learning model to adjust the plug and abandonment operation, wherein the trained machine-learning model is trained on data about a performance of historical plug and abandonment operations, emission reduction associated with the historical plug and abandonment operations, and a type of wellbore associated with the historical plug and abandonment operations.

* * * * *